July 29, 1958     T. S. HOLMES     2,845,307
DETACHABLE COUPLING FOR SCAFFOLD ELEMENTS
Filed April 19, 1954
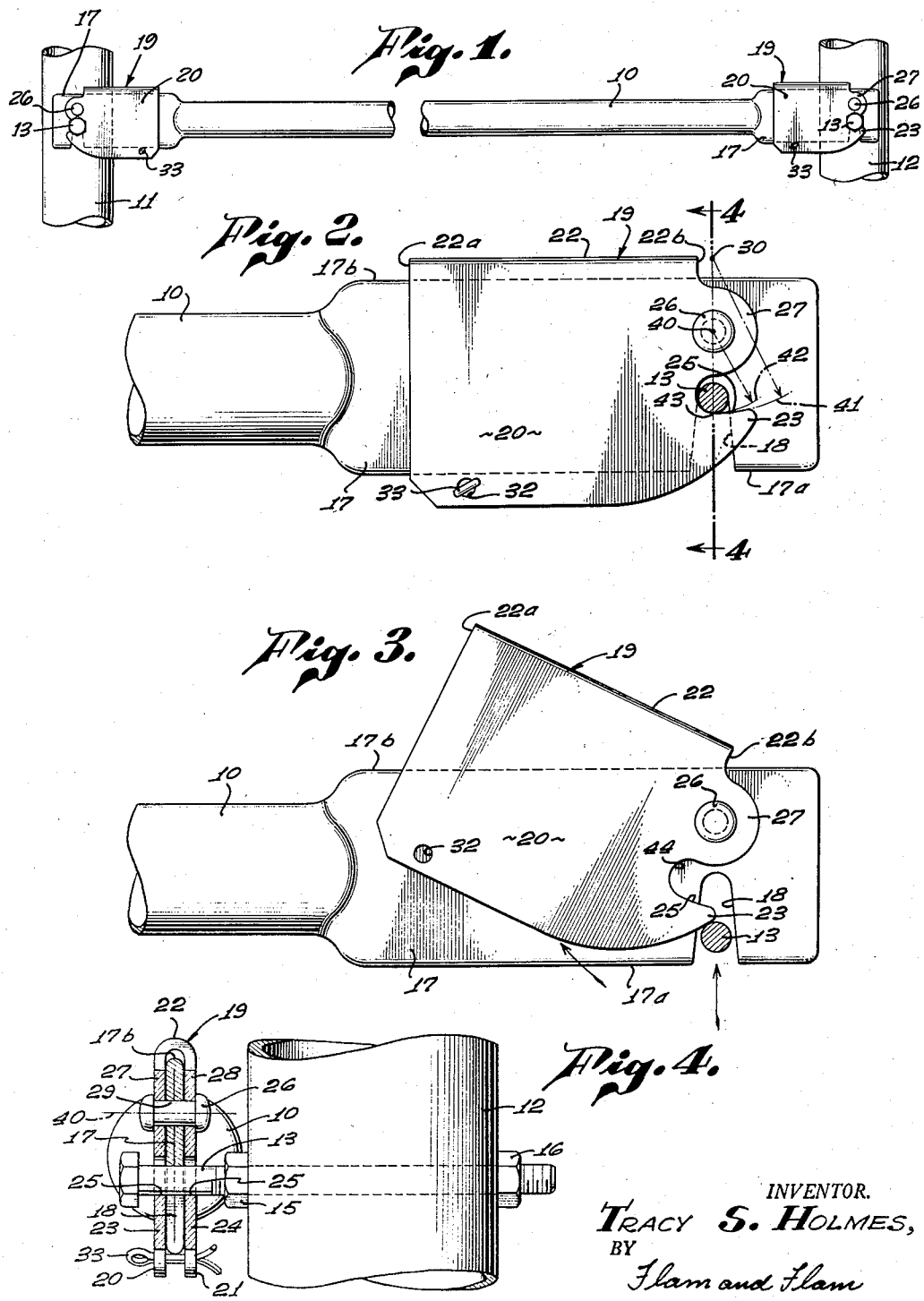
INVENTOR.
TRACY S. HOLMES,
BY
Flam and Flam
ATTORNEYS.

United States Patent Office 2,845,307
Patented July 29, 1958

2,845,307

DETACHABLE COUPLING FOR SCAFFOLD ELEMENTS

Tracy S. Holmes, Santa Monica, Calif., assignor to Superior Scaffold Company, Culver City, Calif., a corporation of California Application April 19, 1954, Serial No. 423,885

8 Claims. (Cl. 304—40)

This invention relates to a scaffold structure, and particularly to a detachable coupling for the frame elements of the scaffold structure.

It is highly desirable that a scaffold structure be capable of quick and easy assembly. It is not uncommon to provide connections between scaffold elements, such as braces and columns, requiring nuts and bolts to hold them in place. Manipulation of the nuts and bolts is laborious and time consuming. It is the primary object of this invention to provide a simple coupling for the frame elements of a scaffold that does not require such laborious and time consuming operations.

It is another object of this invention to provide a scaffold coupling of this character that is simple in structure yet effective to provide a sturdy construction.

This novel coupling can be made a part of a scaffold frame element, one or both ends being provided with a coupling. It is a further object of this invention to provide a scaffold structure in which a frame element incorporating the invention may be coupled to another frame element by a simple manipulation at the remote end of the frame.

The novel coupling may be utilized for quick connection of elements that are incorporated in structures other than scaffolds.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a broken elevation showing a portion of a scaffold structure incorporating the present invention;

Fig. 2 is an enlarged view showing one end of the frame element of Fig. 1, incorporating the novel coupling;

Fig. 3 is a view similar to Fig. 2, but showing the coupling in another position; and Fig. 4 is a sectional view, taken along the plane indicated by line 4—4 of Fig. 2.

A horizontal scaffold frame element or brace 10 shown in Fig. 1 has opposite ends secured to spaced-apart vertical supports or columns 11 and 12 by aid of the novel coupling.

In the present instance, identical couplings are provided for each end of the frame element 10, which may be of tubular form.

A bolt 13, projecting laterally of the vertical support 12, serves as the support for the right-hand end of the frame element or brace 10. The bolt 13 in this instance extends transversely through the support 12, and is held firmly in place by nuts 15 and 16 cooperating with opposite projecting ends of the bolt.

The end 17 of the frame element 10 is flattened, and is provided with a recess or slot 18 extending inwardly of the flattened end 17 from the lower edge 17a thereof. The bolt 13 may be received in this recess 18, the bottom of the recess 18 bearing upon the upper element of the cylindrical surface of bolt 13. The sides of the recess or slot 18 diverge outwardly for facilitating the positioning of the parts.

In order to prevent the bolt 13 from moving out of recess 18, such as upon inadvertent upward movement of the frame element 10, the frame element 10 carries a latch structure.

The latch structure is formed by a clip 19 that has a configuration to fit the flattened end 17 of the frame element 10. For this purpose, the clip 19 is generally U-shaped in cross-section (Fig. 4), the flattened end 17 being accommodated between the sides or legs 20 and 21 of the clip. A central upper connecting portion or yoke 22 between the sides 20 and 21 of the clip opposes the upper edge 17b of the flattened end 17.

The legs 20 and 21 of clip 19 have similar latching projections 23 and 24 integrally formed at the lower right-hand corners of these legs. These projections are adapted selectively to extend transversely of the sides of the bolt-accommodating recess or slot 18 to be in the path of relative movement between the bolt 13 and the slot 18. Upwardly facing arcuate latching surfaces 25, formed on the projections 23 and 24, are engageable with the lower element of the cylindrical surface of bolt 13 when the bolt is seated in its recess 18. When operative, the latching projections may be considered as closing the opening of the slot or recess 18.

For securing the clip 19 to the flattened end 17 and for providing a means whereby the latching projections 23 and 24 may be retracted, a pivotal mounting for clip 19 is provided. A pin 26 extends through aligned ears 27 and 28 of the clip legs 20 and 21 and also passes through an aperture 29 provided in the flattened end 17. The ears 27 and 28 are located near the upper right-hand portion of the sides 20 and 21, and above the latching projections 23 and 24. The aperture 29 for the pin 26 is spaced above the inner end of the bolt-accommodating recess 18.

The clip 19 is angularly movable about the axis 40 defined by the pin 26. The upper edge 17b of the flattened end 17, cooperating alternately with the left and the right-hand edges 22a and 22b of the yoke 22 of the clip, limits counter-clockwise and clockwise movement respectively of the clip.

In the counter-clockwise position of the clip 19, the latching projections 23 and 24 are in operative position, as shown in Fig. 2. Upon clockwise movement of the clip 19, the latching projections 23 and 24 are retracted to permit movement of the bolt 13 into or out of the recess 18.

The center of gravity of the clip 19 is spaced substantially to the left of the axis 40 of movement of the clip 19. Accordingly, the weight of the clip maintains it in its counter-clockwisemost operative position. However, forces other than gravity may be used.

The end edge 22b of the central connecting portion 22 is so located with respect to the upper edge 17b of the end 17 that its path of angular movement is restricted to materially less than a right angle. Accordingly, for a substantially horizontal orientation of the frame element 10, the center of gravity of the clip 19 never passes to the right-hand side of the axis 40. Thus, for substantially horizontal orientation of the frame element 10, there is one and only one stable position of the clip, corresponding to operative position.

Normally, the latching projections 23 and 24 extend across the path of entering movement of the bolt 13. The lower surfaces 31 of the latching projections are engageable with the bolt 13 upon attempted entering movement of the bolt 13. In order to effect automatic retraction of the latch upon such engagement, the surfaces 31 slant so that the reaction on the surfaces imposes a clockwise torque upon the clip 13 about the axis 40, resulting in corresponding movement of the clip. Accordingly, the latching projections 23 and 24 are retracted. The bolt 13 passes over the end of the sloping surface 31 as it seats in the bottom of the slot 18. The clip 19 then returns under the influence of gravity to latching position, and the surfaces 25 engage beneath the slot 13.

Actual engagement between the bolt 13 and the latching surfaces 25 is effected only upon complete return of the latch to operative position. Thus, when the bolt 13 is seated in the groove 18, the outer portions of the latching surfaces clear the bolt when passing beneath it. The clearance of successive portions of the latching surfaces diminishes until engagement is finally effected at the position shown in Fig. 2. For this purpose, the latching surfaces 25 are defined by curves 41 diverging from arcs centered at the axis 40 and passing through the lower element of the bolt 13 when seated.

The points of divergence 43 of the curves 41 defining the latching surfaces 25 from the arcs 42 are located at the inner portions of the latching surfaces 25. Engagement between the lower element of the bolt 13 and the latching surfaces 25 is accordingly effected at this point 43.

The latching surfaces 25 are curved abruptly as at 44 to engage the side of the bolt 13 when the point 43 on the latching surfaces 25 engage the lower element of the bolt 13.

It is important that should any upward force be exerted on the brace 10, the latch remain in operative position despite a reaction at the point 43. To insure this result, the center of curvature 30 of the latching surfaces 25 at the point 43 is aligned with the axis 40. Since the reaction on the surfaces 25 would be directed toward the center of curvature 30, no turning torque would be imposed about the axis 40, since the line of reaction passes through the axis 40.

Accordingly there is no tendency for the latch to move from operative position.

The latch is sufficiently stable such that, if desired, the structure 12 carrying the bolt 13 can be the supported element. The bolt 13 now would bear against the latching surface 25. The pin 26 mounting the clip 19 must, in this instance, be sufficiently strong to resist shear.

Conveniently, the curves 41 forming the latching surfaces 25 are formed as arcs centered about the point 30. The center is located substantially above the axis 40, thus providing the appropriate divergence between the curves 41 forming the latching surfaces 25 and the arc 42.

The brace 10 may be automatically latched by a simple manipulation at the remote end of the frame element 10. By virtue of this, quick installation of the frame element is accomplished.

To release the latch the clip 19 must be manually retracted.

For purposes of added safety, the clip can be locked in operative position. For this purpose, a wire or cotter pin 33 passes through aligned apertures 32 of the legs 20 and 21. These apertures 32 are spaced beneath the lower edge 17a of the flattened end 17. Accordingly the pin 33 is engageable with the lower edge 17a to prevent upward or clockwise movement of the clip 19. In this manner, accidental retraction of the latch is prevented.

The head 34 of the bolt 13 limits relative sliding movement of the coupling along the length of the bolt 13.

The inventor claims:

1. In combination: a scaffold structure having a pin; a brace element having a recess extending inwardly from one side thereof for receiving said pin, said recess forming a seat opposed to the mouth of said recess; a latch member pivoted on an axis transverse to the element; the center of gravity of the member being substantially spaced from said axis; said member having a latching projection; said projection being positioned by the weight of said member to extend across said recess when said element is so oriented that said recess opens in a direction having a downward component; the member being angularly movable to an inoperative position in which said projection substantially clears the recess; the bottom of said recess being located between the projection and said axis when said projection is in operative position; the distance between the projection and the seat when the member is in operative position corresponding substantially to the thickness of the pin.

2. In a latch structure cooperable with a pin or the like: an element having a recess extending inwardly from one side thereof for receiving said pin; a bifurcated latch member having an interconnecting yoke portion extending along the other side of said element; and means mounting the member for pivotal movement on the element about an axis transverse to the element, the axis being located in transverse alignment with the bottom of the recess on that side of the element opposite the recess; opposite ends of the yoke respectively being engageable with the other side of the element for limiting angular movement of the member; the bifurcations of the member each having latching projections provided with latching surfaces and extending across the sides of the recess to extend beneath the pin seated in the recess when the member is in one position; the latching projections being retracted when the member is moved from said one position; the latching surfaces being defined by curves diverging from an arc centered about the axis of movement of said member and including the pin when seated, the inner portions of said latching surfaces being engageable with the lower portion of said pin when the pin is substantially seated, the radii of curvature of said latching surfaces at said inner portions passing through the axis of movement of said member.

3. In a latch structure cooperable with a pin or the like: an element having a recess extending inwardly from one side thereof for receiving said pin; a bifurcated latch member having an interconnecting yoke portion extending along the other side of said element; and means mounting the member for pivotal movement on the element about an axis transverse to the element, the axis being located in transverse alignment with the bottom of the recess on that side of the element opposite the recess; the center of gravity of the member being spaced substantially from said axis of movement; opposite ends of the yoke respectively being engageable with the other side of the element for limiting angular movement of the member to less than a right angle; the weight of the member urging the member to one angular position when the recess opens substantially downwardly; the bifurcations of the member each having latching projections provided with latching surfaces and extending across the sides of the recess to extend beneath the pin seated in the recess when the member is in said one position; the latching projections being retracted when the member is moved from said one position; the latching surfaces being defined by curves diverging from an arc centered about the axis of movement of said member and including the pin when seated, the inner portions of said latching surfaces being engageable with the lower portion of said pin when the pin is substantially seated, the radii of curvature of said latching surfaces at said inner portions passing through the axis of movement of said member.

4. In a latch structure cooperable with a pin or the like: an element having a recess extending inwardly from one side thereof for receiving said pin; a bifurcated latch member having an interconnecting yoke portion extending along the other side of said element; and means mounting the member for pivotal movement on the element about an axis transverse to the element, the axis being located in transverse alignment with and above the bottom of the recess; the center of gravity of the member being spaced substantially from said axis of movement; opposite ends of the yoke respectively limiting angular movement of the member to less than a right angle; the weight of the member urging the member to one angular position when the recess opens substantially downwardly; the bifurcations of the member each having latching projections provided with latching surfaces and extending across the sides of the recess to extend beneath the pin seated in the recess when the member is in said one position; the latching projections being retracted when the member is moved from said one position; the latching surfaces being defined by curves diverging from an arc centered about the axis of movement of said member and including the pin when seated, the inner portions of said latching surfaces being enageable with the lower portion of said pin when the pin is substantially seated, the radii of curvature of said latching surfaces at said inner portions passing through the axis of movement of said member; said bifurcations having surfaces adjoining said latching surfaces engageable with the pin upon entering movement of the pin to move the latch away from said one position to automatically position said member.

5. In combination: a scaffold structure having a pin; a brace element having a recess extending inwardly from one side thereof for receiving said pin; a latch member pivoted on an axis transverse to the element; the center of gravity of the member being substantially spaced from said axis; said member having a latching projection; said projection being positioned by the weight of said member to extend across said recess when said element is so oriented that said recess opens in a direction having a downward component; the member being angularly movable to an inoperative position in which said projection substantially clears the recess; the bottom of said recess being located between the projection and said axis when said projection is in operative position; the distance between the projection and the seat when the member is in operative position corresponding substantially to the thickness of the pin; said projection having a curved surface engageable with said pin upon attempted disengagement of the element and the pin, the radius of curvature of which passes substantially through said axis.

6. In combination: a scaffold structure having a pin; a brace element having a recess extending inwardly from one side thereof for receiving said pin; a latch member pivoted on an axis transverse to the element; the center of gravity of the member being substantially spaced from said axis; said member having a latching projection; said projection being positioned by the weight of said member to extend across said recess when said element is so oriented that said recess opens in a direction having a downward component; the member being angularly movable to an inoperative position in which said projection substantially clears the recess; the bottom of said recess being located between the projection and said axis when said projection is in operative position; the distance between the projection and the seat when the member is in operative position corresponding substantially to the thickness of the pin; said projection having a curved surface engageable with said pin upon attempted disengagement of the element and the pin, the radius of curvature of which passes substantially through said axis, said radius of curvature being greater than the distance of said portion from said axis.

7. In a scaffold structure: a brace having a flattened end in which a recess extends inwardly from one side thereof, the recess forming a seat opposed to the mouth of the recess and cooperable with a pin or the like; a latch member comprising substantially rectangular legs and a portion connecting the legs, the flattened end being located between the legs; means pivotally mounting the latch member on the brace end on an axis near corresponding corners of the legs and near the other side of said brace end; said axis and said recess being substantially aligned transversely of the flattened end; the connecting portion being engageable with the brace end for limiting angular movement of the member to less than a right angle; said member having projections positioned across the recess by the weight of said member when said recess extends in a direction having a downward component; said projections having concave surfaces, portions of which are engageable beneath the pin, the center of curvature of said concave surfaces at said portions passing substantially through said axis; said projections also having cam surfaces engageable with the pin on entering movement thereof for retracting the member until said pin clears the ends of said projections.

8. In a latch for a scaffold structure or the like cooperable with a pin or the like: a brace element having a recess extending inwardly from one side thereof for receiving the pin; a latch member having bifurcations and a connecting portion; means movably mounting the member on the element, the bifurcations of said member each having a latching projection capable of extending across the recess, each projection having a surface portion engageable with the pin to prevent outward movement of the pin from the recess, said surface portions facing inwardly from the ends of the bifurcations and toward the connecting portion; the connecting portion of the member being located at the other side of the brace element when said surface portions are in operative position.

References Cited in the file of this patent

UNITED STATES PATENTS

| | | |
|---|---|---|
| 427,180 | MacLaurin | May 6, 1890 |
| 436,653 | Folsom | Sept. 16, 1890 |
| 844,907 | Aikin | Feb. 19, 1907 |
| 1,101,158 | Wilde | June 23, 1914 |
| 1,136,786 | Faus | Apr. 20, 1915 |
| 1,581,748 | Lund | Apr. 20, 1926 |
| 2,381,633 | Young | Aug. 7, 1945 |
| 2,555,782 | Brownstein | June 5, 1951 |
| 2,604,678 | Mayes | July 29, 1952 |